Patented Feb. 17, 1953

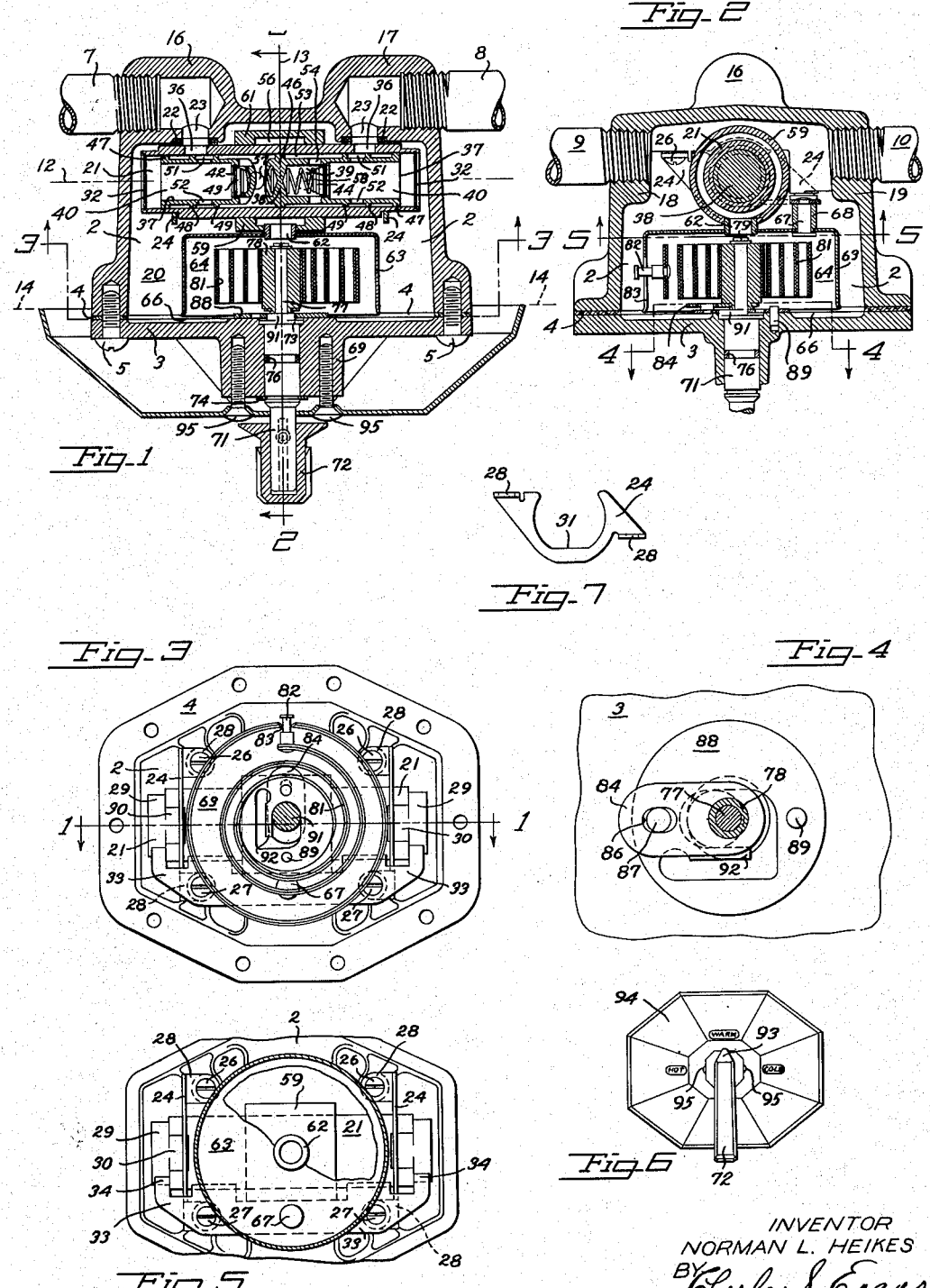

2,628,782

UNITED STATES PATENT OFFICE 2,628,782

EQUALIZING AND MIXING VALVE

Norman L. Heikes, San Pablo, Calif., assignor to Wm. Kenneth Rosenberry, doing business as Berkeley Scientific Company, Richmond, Calif.

Application April 4, 1950, Serial No. 153,873

7 Claims. (Cl. 236—12)

My invention relates to mixing valves and particularly to a valve which first equalizes the pressures of liquids from two different sources, and at unlike temperatures, then thoroughly mixes them in an automatically adjusted volumetric proportion, and discharges the resultant in a stream at a predetermined mean temperature.

Another object is the provision of a mixing valve having the characteristics of a precision instrument in the accuracy and reliability of its operation and which is nevertheless capable of manufacture and assembly at relatively low costs.

Still another object is the provision of a valve of the character described embodying improved means for mounting the component operating parts, and improved and more sensitive thermally responsive means for the automatic proportioning of the hot and cold flow into the mixing chamber.

The invention possesses other objects, some of which with the foregoing will be brought out in the following description of the invention. I do not limit myself to the showing made by the said description and the drawings, since I may adopt variant forms of the invention within the scope of the appended claims.

Referring to the drawings:

Fig. 1 is half section taken in a plane passing through the two main axes of the valve. The plane of section is indicated by the line 1—1 of Fig. 3. Fig. 2 is also a half section taken in a plane indicated by the line 2—2 of Fig. 1. Fig. 3 is a sectional view taken in the plane indicated by the line 3—3 of Fig. 1. Fig. 4 is a sectional view taken in the plane indicated by the line 4—4 of Fig. 2. The mechanism shown is part of that which connects the manual control handle with the thermostat. Fig. 5 is a sectional view taken in the plane indicated by the line 5—5 of Fig. 2. Fig. 6 is an elevation of the escutcheon plate and control handle, which is all that appears on the wall when my valve is installed under usual conditions. Fig. 7 is a detail showing the cradle bracket in elevation.

Broadly considered the valve of my invention includes a housing conditioned for installation in a shower bathroom or stall. Hot and cold water enter the housing through different supply lines and at different pressures which may fluctuate over a considerable range. Automatically operating means including a piston valve are provided for equalizing the pressures of the incoming streams and delivering the equalized flow into separate chambers. At this point, there has been little or no change in temperature, only the pressures having been equalized.

Thermally responsive means including a sleeve valve and a thermally sensitive element now take over the admission into a single mixing chamber of hot and cold waters from the two chambers in amounts automatically proportioned to give a mean temperature of the discharge flow corresponding to a predetermined manual setting of the valve. The flow from the mixing chamber discharges over the thermally sensitive element and into the housing from which it is conducted through conventional valve controlled delivery pipes to tub and shower head. Thus it is the temperature of the water immediately before it reaches the point of delivery, that controls the proportions of hot and cold water admitted to the mixing chamber by the sleeve or proportioning valve; and this fact coupled with accurately made and smoothly working parts gives a close and accurate control of the temperature of the discharging stream in close agreement with the presetting, which is conveniently accomplished by a control handle mounted on an escutcheon plate bearing guiding indices.

While this description relates to the handling of water in the home because that is perhaps the field in which it is most commonly used, my valve structure is adaptable with little or no change for a variety of industrial applications, such as wineries, brewing and soft drink industries, chemical plants, and any others where liquids of the same character but differing in pressure and temperature must be combined at equalized pressures, and delivered at a predetermined mean temperature.

Referring now especially to Figs. 1 and 2, the equalizing and mixing valve of my invention comprises a cup-like housing 2, closed by the cover plate 3, seated on a gasket ring 4 and secured by screws 5.

Ordinarily the housing is supported in a wall by the feed pipes 7 and 8, Fig. 1, and delivery pipes 9 and 10, Fig. 2, threaded into it, the two main axes 12 and 13 being preferably horizontal. Usually the housing is installed so that the closure plate lies slightly in front of the plane 14 of the wall. This places the connecting pipes at or near the opposite end of the housing, and hollow bosses 16 and 17 disposed at the rear and on opposite sides are threaded to receive the hot and cold feed water pipes 7 and 8 respectively, while delivery pipes 9 and 10 are threaded into the bosses 18 and 19 respectively which thicken the housing wall on the inside of the chamber 20 enclosed by the housing.

Means are provided for receiving water from pipes 7 and 8 and conducting the flow from them to separate but adjacent chambers. Regardless of temperatures the pressures of these two streams is equalized before reaching the chambers; and the equalizing means is effective despite sudden and frequent fluctuations in pipe pressure which characterize nearly all installations of water pipes.

Rigidly secured across the end wall of the housing is a hollow cylinder 21. This is held at each end against a gasket ring 22 which surrounds the inlet port 23, formed in the housing wall adjacent the end of the inlet pipe at that side, by a cradle bracket 24, Fig. 7. The bracket in turn is fixed by screws 26 and shoulder screws 27, threaded through tabs 28 and into the housing wall. The ends 29 of the cylinder are reduced in diameter as shown; and then are further provided with a flat surface 30 which engages the straight part 31 of the cradle bracket, so that the cylinder is prevented from turning. The open ends of the cylinder are closed by a disk 32 held against an internal shoulder by spinning over the thin rim of the cylinder.

Caught under the shoulder screws 27 on one side of the cylinder is a strut 33, the ends 34 of which slidably embrace the cylinder as shown, each end engaging the near shoulder adjacent the flat. While the shoulder screws 27 rigidly hold the ends of the cradle bracket, they are loose in the strut, the holes therein being somewhat larger than the diameter of the shoulder part of the retaining screw, so that a small transverse movement of the strut toward and from the cylinder is permitted, although lengthwise movement parallel to the cylinder axis 12 is prevented by the cylinder-engaging ends. The significance of this mounting of the strut with reference to the cylinder will be clarified in the later explanation of the operation of the thermostatic control of the mixing valve.

The cylinder 21 is provided at each end with a round port 36 in register with the port 23 at that end, so that water from the adjacent pipe (7 or 8) may flow freely through the aligned ports. Means are provided however for proportioning the flows of water actually entering the cylinder through each port 36 in order to equalize their pressures. Slidably arranged in the cylinder is a free hollow piston 37 divided transversely into like halves by the partition 38. Each half is further divided into inner chamber 39 and end chamber 40 by the valve seat 42 and the check valve 43, opening toward the central partition of the piston against the spring 44.

The outside surface of the piston is formed with a plurality of circumferential flanges; flange 46 at the center, flange 47 at each end, flange 48 across each port 36, and flange 49 spaced inwardly from each flange 48. These flanges provide the bearing contact with the interior of the cylinder and also form between piston and cylinder walls, on each side of the center flange, circular chambers or passages through which water may flow. Between flanges 48 and 49 at each end, is a circular chamber 51, connected to the end chamber 40 of the piston by the piston inlet ports 52. Between the central flange 46 and flange 49 on each side, is circular chamber 53, connected through the piston outlet ports 54 with the inner chamber 39.

The ports are so proportioned that with the piston central in the cylinder, each flange 48 lies across its port 36 slightly off the center line of the port and toward the far side of the port measuring from the center flange 46. Thus when the inflowing hot water from pipe 7 is at a higher pressure than cold water coming in from pipe 8, the free piston moves to the right (Fig. 1) until the pressures in the two chambers 40 balance. Should the cold water be at a higher pressure, the piston moves to the left until equalization takes place. Thus, with any change in pressures in the feed lines, the piston valve moves to reduce the flow from the high pressure side and increase the flow from the low pressure side until the two pressures are equal.

Water in the end chamber 40 passes through the check valve 43 and into the inner chamber 39, and thence through piston outlet ports 54 into the circular chamber 53. So far the hot and cold streams have been kept separate, their pressures only having been equalized, but at this point, the flow from each of the chambers 53 is into a mixing chamber 56, through port 57 for the hot water, and port 58 for the cold water, these ports being in the wall of cylinder 21.

The purpose of the check valve 43 is to prevent water pressure in one end of the piston from being transmitted through the various ports and passages to the other end of the piston and so equalizing the pressures in the two ends without movement of the piston. Unless the various interconnected passages provide substantial restriction to flow, any increase in pressure at one end of the piston results in a corresponding increase in pressure at the other end, with the result that the piston does not move.

The check valves 43 are placed between the pressure equalizing portion of the system and the thermostatically responsive portion of the system. Therefore, while the water is free to flow past the check valves from each end of the piston into the common mixing chamber 56, the check valves prevent flow in the reverse direction back into the piston end chamber. This removes the need for flow-limiting apertures in the system and permits use of an external flow-regulating valve.

Without the use of check valves as indicated it would be impossible to use any means for regulating the flow without seriously upsetting temperature regulation. This would be true even if restrictive apertures were employed, since the flow-regulating control would automatically become the principal restriction and would nullify the restrictive effects of any other apertures in the system.

Means are provided for proportioning the amounts of hot and cold water flowing into the mixing chamber to give a mixture having a temperature corresponding to the selective setting of a pointer on a calibrated dial. The mixing chamber 56 is within the hollow sleeve valve 59, slidably arranged on the outside surface of the cylinder 21, and with the thick end walls 61 of the sleeve overlying the ports 57 and 58.

Journaled in one side of the sleeve valve on the axis 13 is a hollow stub shaft 62, fixed concentrically in the cup 63, which encloses a chamber 64, opening into the main housing chamber 20 through the relatively narrow space 66 between the cup rim and the cover plate 3. Water from the mixing chamber flows through the hollow shaft into the cup chamber 64, and thence through the annular space 66 into the main housing chamber 20 and out through whichever discharge pipe is open.

The cup is further supported and its operative position secured by a pin 67, rigidly fixed midway in the strut 33, and forming a bearing on which the hub 68, rigidly secured to the cup, is journaled. It will be remembered that the strut is movable a small distance toward or from the cylinder. This permits the cup to swing in a small arc about the pin 67 to effect a corresponding movement back and forth of the sleeve valve to which it is connected by the shaft 62.

Thermally responsive means is arranged within the cup to be submerged in the water flowing therethrough; and is so connected to the cup and an external control means, that the sleeve valve is automatically actuated to proportion the hot and cold inflow as necessary to give the discharging stream the desired temperature. Journaled in the central boss 69 of the cover plate is a shaft 71, having a pointer handle 72 keyed to its outer end. An integral flange 73, bearing on the inside of the boss and a split ring 74 bearing on the outside retain the shaft axially in position, and a packing ring 76 prevents leakage through the bearing.

The shaft is provided at its inner end with the concentric reduced diameter extension 77 on which is journaled the hub 78, held thereon by the cap screw 79. A bi-metallic strip coil 81 is anchored in the hub; and its free end is furnished with a headed pin 82 which engages in a slot 83 formed in the cup wall.

Connection of the shaft 71 to the thermostat coil is made by means of a lever 84, Figs. 2 and 3, fixed to the hub and having a slot 86 engaging a pin 87 fixed in the plate 88, pivoted by pin 89 to the cover plate. The central portion of the plate is formed with an elongated opening, as shown in Fig. 3, to receive an eccentric disk 91 formed integrally with the shaft 71 at the base of the extension 77. Preferably the plate is cut away on one side to provide a spring arm 92, so that there is close engagement between eccentric disk and plate, and no lost motion at this important connection.

The shaft 71 may be manually rotated by the handle 72, provided with a pointer end 93. The handle ranges over the face of an escutcheon plate 94, mounted on the cover plate boss 69 by screws 95, and lying snug against the wall within which the valve is installed. The face of the escutcheon is calibrated as shown in Fig. 6 into "Hot," "Warm" and "Cold" divisions which are sufficient for domestic use.

From the above it will be clear that the thermostat means and connections are so proportioned and arranged that turning the handle, say from "Cold" to "Hot," turns the shaft 71 and eccentric 91 to swing the plate 88 laterally (to the left, Fig. 3), about its pivot pin 89. This motion is communicated to the hub 78 through the pin 87 and lever arm 84, the hub turning counter-clockwise as seen in Fig. 3, on the pin shaft 77 and expanding the coil 81 to swing the cup 63 to the left about its pivot pin 67. Since the cup is connected to the sleeve valve by stub shaft 62, the swing of the cup is immediately effective to move the valve in the same direction, increasing the open area of the hot water port 57 and decreasing the open area of the cold water port 58. With one of the discharge pipes to tub or shower open, the hot water from the mixing chamber is almost instantly effective on the thermostat coil, which responds by moving the cup and connected sleeve valve one way or another to proportion the hot and cold flow in accordance with the handle setting.

I claim:

1. In a valve for mixing hot and cold water, a housing, a cylinder in the housing and having inlet passages for admitting hot and cold water thereto, a cylinder mounting bracket fixed in the housing about opposite ends of the cylinder, a piston valve within the cylinder for equalizing the pressures of the entering hot and cold streams, a hollow sleeve valve surrounding the cylinder for receiving and mixing the pressure-equalized streams, thermostat means arranged in the housing, means for discharging the mixed water from the sleeve valve upon the thermostat means, linkage connecting the thermostat means to the sleeve valve, and a discharge passage in said housing.

2. In a valve for mixing hot and cold water, a housing, a cylinder in the housing and having inlet passages for admitting hot and cold water thereto, a cylinder mounting bracket fixed in the housing about opposite ends of the cylinder, a piston valve within the cylinder for equalizing the pressures of the entering hot and cold streams, a hollow sleeve valve surrounding the cylinder for receiving and mixing the pressure-equalized streams, a strut supported on the housing and having ends embracing the cylinder, thermostat means arranged in the housing, means for discharging the mixed water from the sleeve valve upon the thermostat means, means including a lever pivoted on said strut for connecting the thermostat means to the sleeve valve, and a discharge passage in said housing.

3. In a valve for mixing hot and cold water, a housing, a cylinder in the housing and having inlet passages for admitting hot and cold water thereto, a cylinder mounting bracket fixed in the housing about opposite ends of the cylinder, a piston valve within the cylinder for equalizing the pressures of the entering hot and cold streams, a hollow sleeve valve surrounding the cylinder for receiving and mixing the pressure-equalized streams, a strut supported on the housing and having ends embracing the cylinder, thermostat means arranged in the housing, manually operable means external the housing for varying the operative range of the thermostat means, a cup pivotally mounted on said strut and enclosing the thermostat means and connecting the thermostat means to the sleeve valve, means for discharging the mixed water from the sleeve valve upon the thermostat means, and a discharge passage in said housing.

4. A mixing valve comprising a housing, a cylinder fixed in the housing, passages in housing and cylinder terminating adjacent each end of the cylinder in an inlet port, a pressure actuated piston valve having a chamber at each end and slidable in said cylinder to vary the relative open areas of the two inlet ports, said piston forming with said cylinder a pair of separate chambers outside the piston, a passage in the piston connecting each separate chamber with the adjacent end chamber, a check valve in each last named passage, an outlet port in the cylinder wall in communication with each separate chamber, a hollow sleeve valve on said cylinder and forming therebetween a mixing chamber, said sleeve valve being slidable on said cylinder to vary the relative open areas of the outlet ports, thermostat means arranged in the housing, means for discharging water from the mixing chamber upon said thermostat means, linkage connecting the thermostat means to the sleeve valve, and a discharge passage in said housing.

5. A mixing valve comprising a housing, a cylinder fixed in the housing, passages in housing and cylinder terminating adjacent each end of the cylinder in an inlet port, a pressure actuated piston valve having a chamber at each end and slidable in said cylinder to vary the relative open areas of the two inlet ports, said piston forming with said cylinder a pair of separate chambers outside the piston, a passage in the piston connecting each separate chamber with the adjacent end chamber, a check valve in each last named passage, an outlet port in the cylinder wall in communication with each separate chamber, a hollow sleeve valve on said cylinder and forming therebetween a mixing chamber, said sleeve valve being slidable on said cylinder to vary the relative open areas of the outlet ports, thermostat means arranged in the housing, means for discharging water from the mixing chamber upon said thermostat means, linkage connecting the thermostat means to the sleeve valve, a discharge passage in said housing, and manually operable means external the housing for varying the operative range of the thermostat means.

6. In a valve for mixing hot and cold water, a housing, a shaft including an eccentric disk and rotatably journaled in the housing, a hub journaled on the shaft, a mixing valve slidably mounted in the housing, a thermally responsive coil fixed on the hub and operatively connected to the mixing valve, a plate engaging the eccentric disk and pivoted to the housing, an arm on the hub operatively connected to the plate, and manually operable means external the housing for rotating said shaft.

7. In a valve for mixing hot and cold water, a housing, a shaft including an eccentric disk and rotatably journaled in the housing, a hub journaled on the shaft, a mixing valve slidably mounted in the housing, a thermally responsive coil fixed on the hub, a cup pivotally mounted in the housing and operatively interposed between the coil and the mixing valve, a plate engaging the eccentric disk and pivoted to the housing, an arm on the hub operatively connected to the plate, a passage through which water from the mixing valve may flow into the cup, and manually operable means external the housing for rotating said shaft.

NORMAN L. HEIKES.

REFERENCES CITED

The following references are of record in the file of this patent:

UNITED STATES PATENTS

| Number | Name | Date |
|---|---|---|
| 990,557 | Holman | Apr. 25, 1911 |
| 1,476,719 | Leonard | Dec. 11, 1923 |
| 1,707,109 | Blair | Mar. 26, 1929 |
| 1,807,040 | Leonard | May 26, 1931 |
| 1,948,044 | Myers et al. | Feb. 20, 1934 |
| 2,175,203 | Leonard | Oct. 10, 1939 |
| 2,250,815 | Ruegg et al. | July 29, 1941 |
| 2,267,976 | Hermann | Dec. 30, 1941 |
| 2,332,995 | Eaton | Oct. 26, 1943 |
| 2,413,896 | Trautman | Jan. 7, 1947 |
| 2,424,891 | Kirchoff | July 29, 1947 |